US012767097B2

(12) United States Patent
Favaretto

(10) Patent No.: US 12,767,097 B2
(45) Date of Patent: Oct. 20, 2026

(54) MOTOR VEHICLE

(71) Applicant: FERRARI S.P.A., Modena (IT)

(72) Inventor: Fabrizio Favaretto, Modena (IT)

(73) Assignee: FERRARI S.P.A., Modena (IT)

( * ) Notice: Subject to any disclaimer, the term of this patent is extended or adjusted under 35 U.S.C. 154(b) by 289 days.

(21) Appl. No.: 18/629,370

(22) Filed: Apr. 8, 2024

(65) Prior Publication Data

US 2024/0343230 A1 Oct. 17, 2024

(30) Foreign Application Priority Data

Apr. 13, 2023 (IT) ........................ 102023000007065

(51) Int. Cl.

*B60K 6/54* (2007.10)
*B60T 1/06* (2006.01)
*B60K 6/38* (2007.10)

(52) U.S. Cl.

CPC .................. *B60T 1/06* (2013.01); *B60K 6/54* (2013.01); *B60K 2006/381* (2013.01)

(58) Field of Classification Search

CPC ... B60K 1/00; B60K 1/02; B60K 1/04; B60K 2001/0416; B60K 7/0007; B60K 2007/0069; B60K 17/043; B60K 17/354; B60K 17/356; B60K 6/54; B60K 6/48; B60K 2006/381; B60K 2006/4825; B60T 1/06; B60T 1/062; F16H 3/093; F16H 3/006; F16H 2200/0056

See application file for complete search history.

(56) References Cited

U.S. PATENT DOCUMENTS

| | | | | |
|---|---|---|---|---|
| 6,689,313 | B2 | 2/2004 | Ferguson et al. | |
| 6,698,313 | B2 | 3/2004 | Gaffney et al. | |
| 11,498,561 | B1 | 11/2022 | Madhani et al. | |
| 2003/0064854 | A1 | 4/2003 | Kotani | |
| 2015/0065294 | A1* | 3/2015 | Borntrager | F16H 61/0403 192/3.25 |
| 2015/0375374 | A1 | 12/2015 | Pettersson et al. | |
| 2015/0375734 | A1 | 12/2015 | Pettersson et al. | |
| 2017/0087975 | A1 | 3/2017 | Cimatti | |
| 2020/0324635 | A1* | 10/2020 | Barna | B60L 7/26 |
| 2021/0010567 | A1 | 1/2021 | Gitt et al. | |
| 2022/0034789 | A1 | 2/2022 | Piltoft et al. | |
| 2022/0314789 | A1 | 10/2022 | Grimminger | |

FOREIGN PATENT DOCUMENTS

EP 3597464 A 1/2020

OTHER PUBLICATIONS

Extended Search Report in EP Application No. 24169156.7-1009, mailed Sep. 17, 2024 (8 pages).
Italian Search Report in IT Application No. 202300007065 mailed Oct. 20, 2023, an English Translation attached hereto (7 pages).

* cited by examiner

*Primary Examiner* — Lori Wu
(74) *Attorney, Agent, or Firm* — Leason Ellis LLP

(57) ABSTRACT

A motor vehicle comprising: a first driving member; a wheel, which is angularly integral to a first shaft, operatively connected to the first driving member and capable of rotating, in use, at a first rotation speed; and a brake; the brake can selectively be operated so as to directly exert a braking torque upon a second shaft of the motor vehicle other than the first shaft and capable of rotating at a second rotation speed, which is different from the first rotation speed; the second shaft is operatively connected to the first shaft.

11 Claims, 13 Drawing Sheets

54
55
E,F
13 (14)
50 (51,52,53)
42 (43)
A,B (C,D)
A,B (C,D)

42 (43)
13 (14)
E,F
55
54
50 (51,52,53)

A,B (C,D)
E,F
54
50 (51,52,53)
55
13 (14)
42 (43)
Z
Y
X

FIG. 20
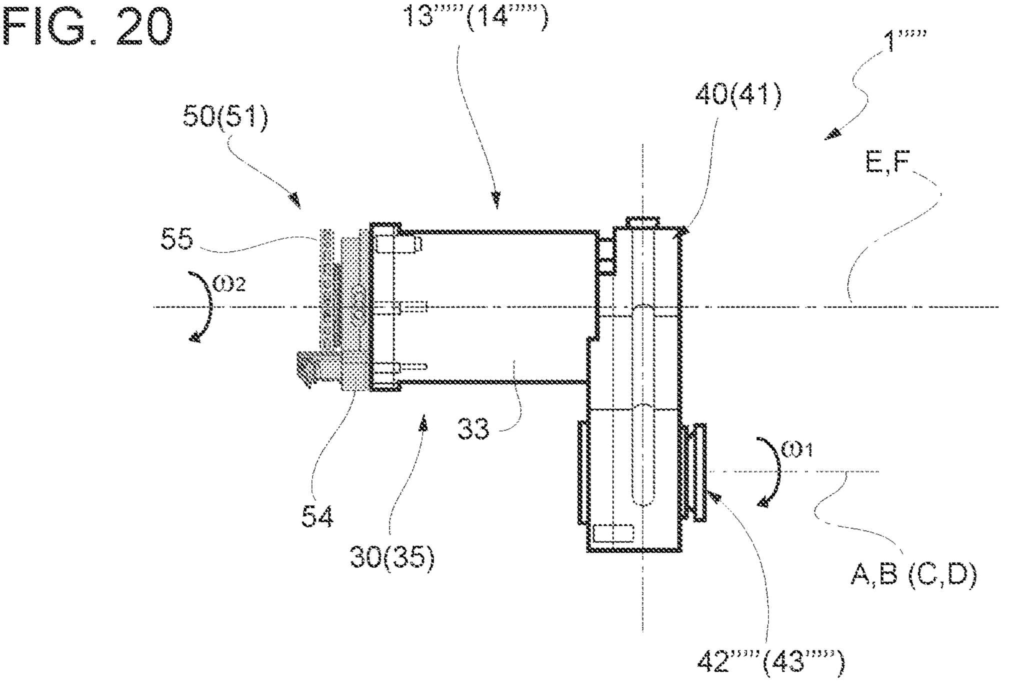
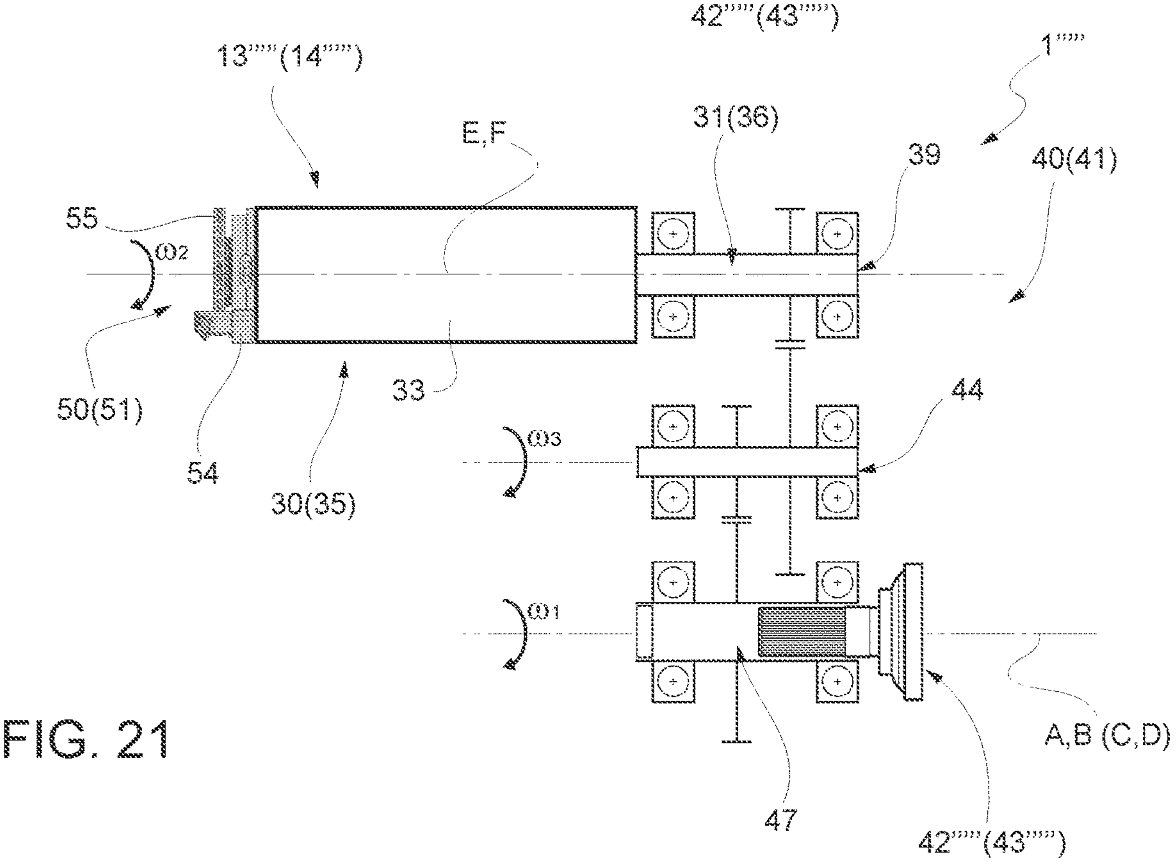
FIG. 21

MOTOR VEHICLE

CROSS-REFERENCE TO RELATED APPLICATIONS

This patent application claims priority from Italian patent application no. 102023000007065 filed on Apr. 13, 2023, the entire disclosure of which is incorporated herein by reference.

TECHNICAL FIELD

The invention relates to a motor vehicle.

BACKGROUND

Traditional motor vehicles comprise, in a known manner:

a body;

a drive assembly with a heat engine operating an output shaft of its with a first rotation speed;

a pair of front wheels, which can rotate around first axes and can be steered by the action of a driver; and a pair of rear wheels, which can rotate around second axes.

Depending on the chosen layout, the front wheels and/or the rear wheels are drive wheels, namely they are operatively connected to the drive assembly so as to be subjected to respective torques.

Regardless of the chosen layout, known motor vehicles further comprise a gearbox, which receives the motion from the output shaft of the heat engine and has a second output shaft, which can rotate at a second rotation speed, which usually is different from the first rotation speed.

In a known manner, the gearbox can be operated by a driver so as to selectively adjust, according to a plurality of discrete values known as gears, the ratio between the aforesaid first and second rotation speed.

The second output shaft is connected to the drive wheels by means of a differential configured to allow the drive wheels to rotate around the respective axle shafts at respective third rotation speed, which are identical to one another in a straight segment of the trajectory to be covered and are different from one another in a curved segment of the trajectory to be covered.

Hybrid motor vehicles are known, for example from US-A-2017/0087975 filed by the Applicant.

Said motor vehicles comprise, in addition to the heat engine, an electric machine having a fourth output shaft connected to the drive wheels.

The electric machine selectively acts as electric motor or as electric generator.

When it is used as electric motor, the electric machine generates an additional drive torque exerted upon the further input shaft and, hence, upon the drive wheels.

When it is used as electric generator, the electric machine absorbs mechanical power from the drive wheels, thus generating a braking torque exerted upon the drive wheels. Said absorbed mechanical power is converted into electrical power, which must be used by a load or stored in an electric battery.

When the hybrid vehicle is driving, it can implement a heat operating mode, in which the drive torque is generated by the sole heat engine and, if necessary, the electric machine serves as electric generator in order to charge the electric battery; an electric operating mode, in which the heat engine is off and the drive torque is generated by the sole electric machine operated as electric motor; or a combined operating mode, in which the drive torque is generated both by the heat engine and by the electric machine operating as motor.

Furthermore, motor vehicles are known, for example from EP-A-3597464, which comprise a plurality of electric motors connected to respective wheels by means of respective transmission assemblies.

The motor vehicle further comprises a braking system consisting of a plurality of disc brakes located in the area of respective wheels.

Each disc brake comprises, in a known manner:

a disc capable of rotating together with the axle shaft of the relative front or rear wheel; and a pad supported by the body and selectively movable to exert a pressure upon the disc and, hence, a braking torque-through friction-upon the relative front or rear wheel.

According to this solution, the disc brake exert the braking torque upon a mechanical member, typically an upright, which rotates at the same third rotation speed as the respective front or rear wheel.

In the automotive industry there is strong need for a reduction in the braking torque and, consequently, in the dimensions of the brakes, though without jeopardizing the effectiveness of the braking action.

This need is particularly strong when dealing with hybrid or full electric motor vehicles, in which part of the braking torque can be obtained by operating the electric machine as electric generator.

Furthermore, the number of components directly fixed to the wheel needs to be reduced, so as to allow designers a great amount of designing flexibility.

Finally, the unsprung mass of the motor vehicle needs to be reduced as much as possible in order to improve the dynamic behaviour of the motor vehicle.

US-B2-6698313, US-A1-2003/064854, US-A1-2015/375734, US-A1-2022/314789 and US-B1-11498561 disclose a known motor vehicle.

SUMMARY

The object of the invention is to provide a motor vehicle, which is capable of fulfilling at least one of the needs discussed above.

The aforesaid object is reached by the invention, as it relates to a motor vehicle as defined in claim 1.

BRIEF DESCRIPTION OF THE DRAWINGS

The invention will be best understood upon perusal of the following detailed description of six preferred embodiments, which are provided by way of non-limiting example, with reference to the accompanying drawings, wherein:

FIG. 20 shows an operating diagram of some components of an axle of a motor vehicle according to a sixth embodiment of the invention; and FIG. 21 shows the operating diagram of FIG. 20 on a larger scale and with parts removed for greater clarity.

DESCRIPTION OF EMBODIMENTS

Figure 1:
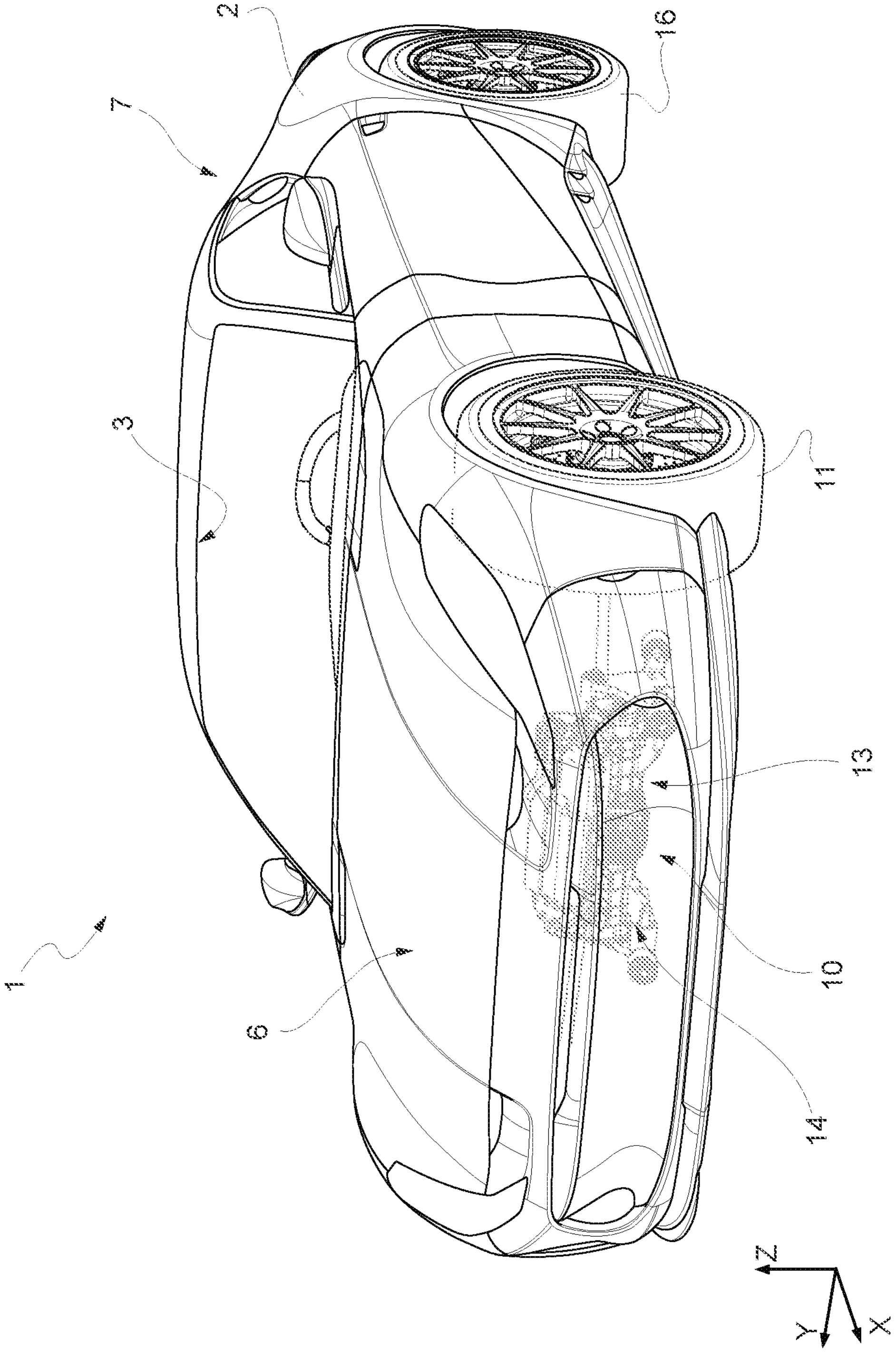
FIG. 1 is a perspective view of a motor vehicle according to a first embodiment of the invention.
Figure 2:
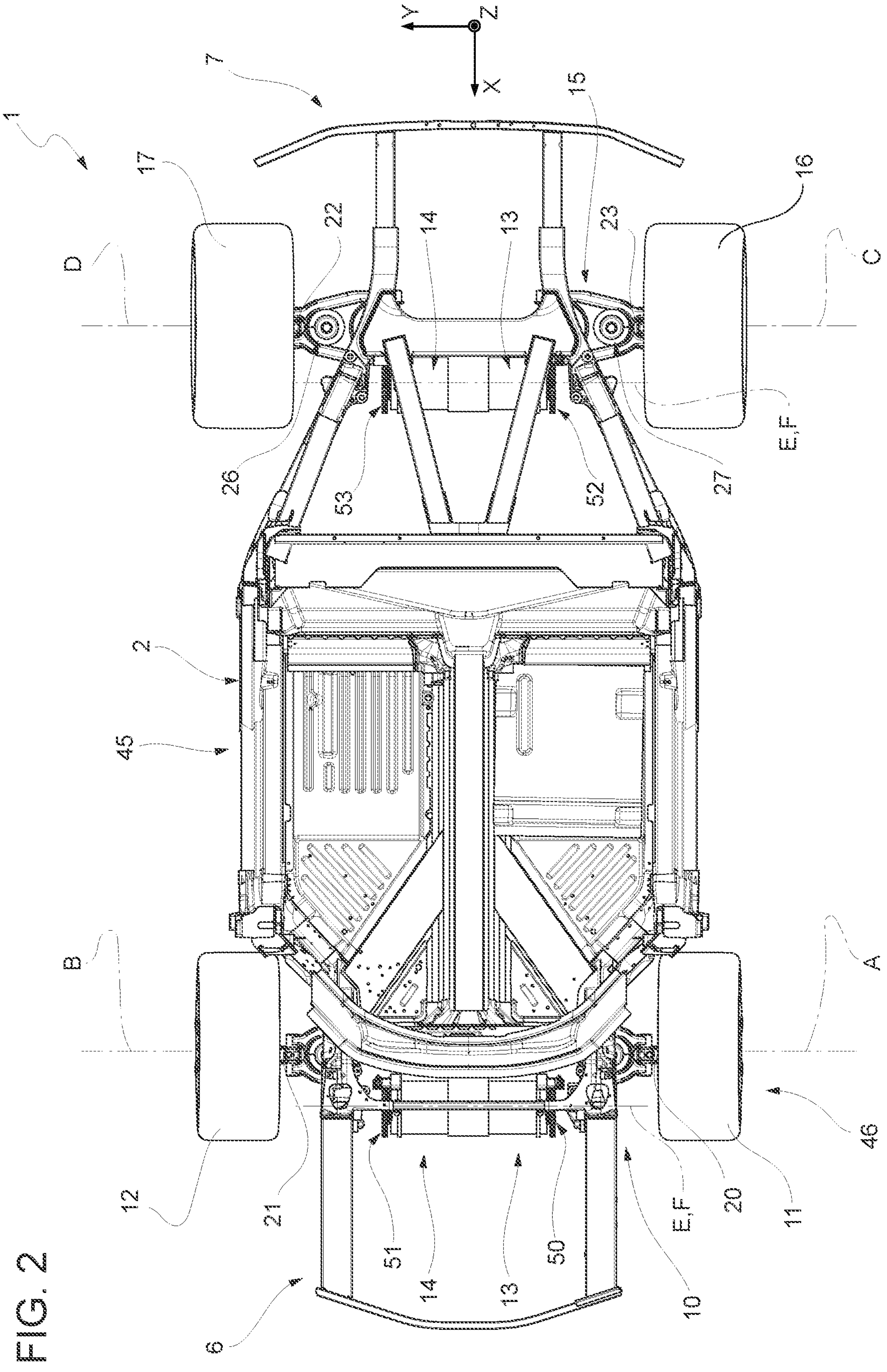
FIG. 2 is a top view of the motor vehicle of FIG. 1 with parts removed for greater clarity.
Figure 3:
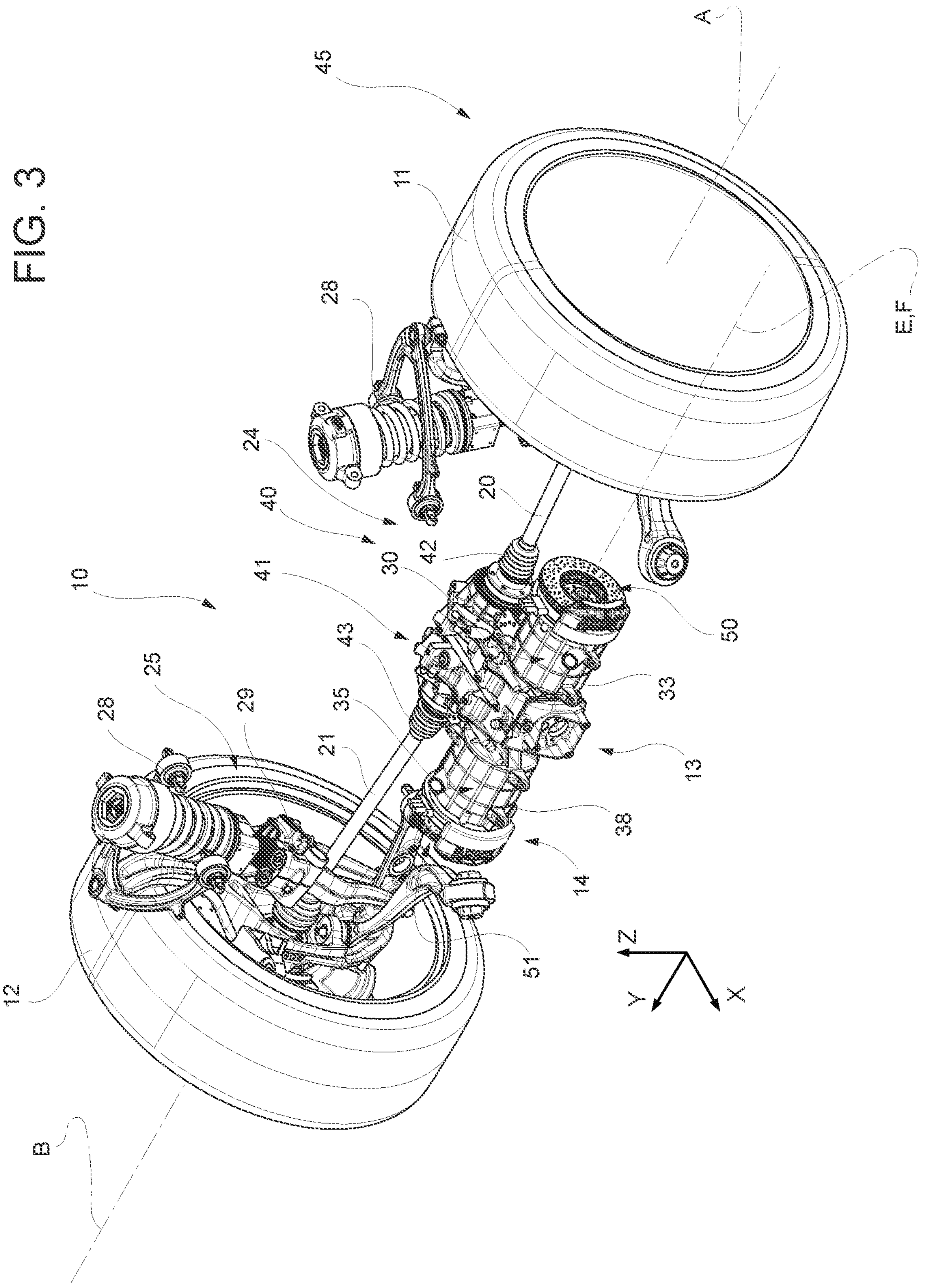
FIG. 3 is a perspective view of an axle of the motor vehicle of FIGS. 1 and 2, with parts removed for greater clarity and on a much larger scale.
Figure 4:
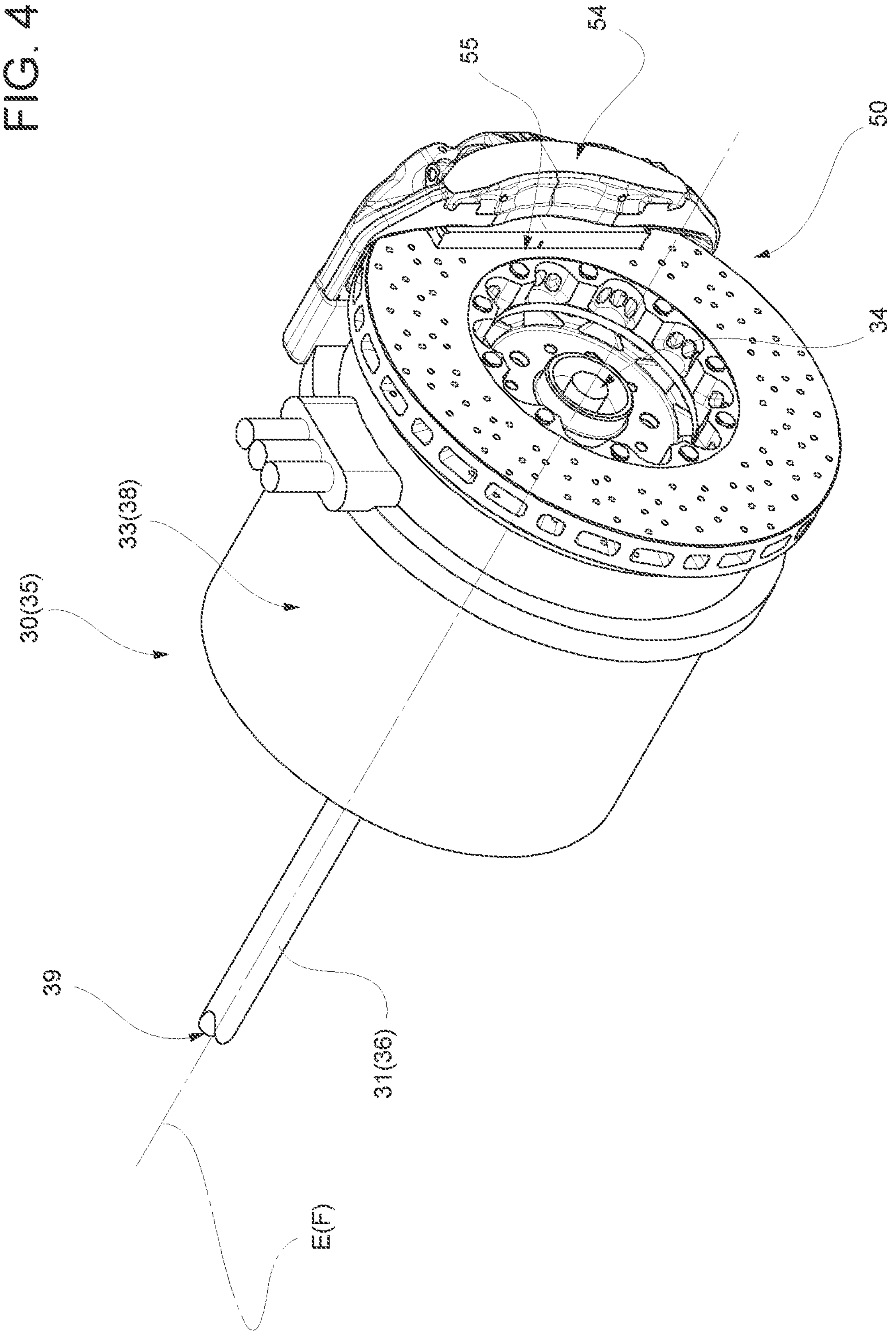
FIGS. 4 and 5 show, in a perspective view and according to different view angles, a component of the axle of FIG. 3.
Figure 5:
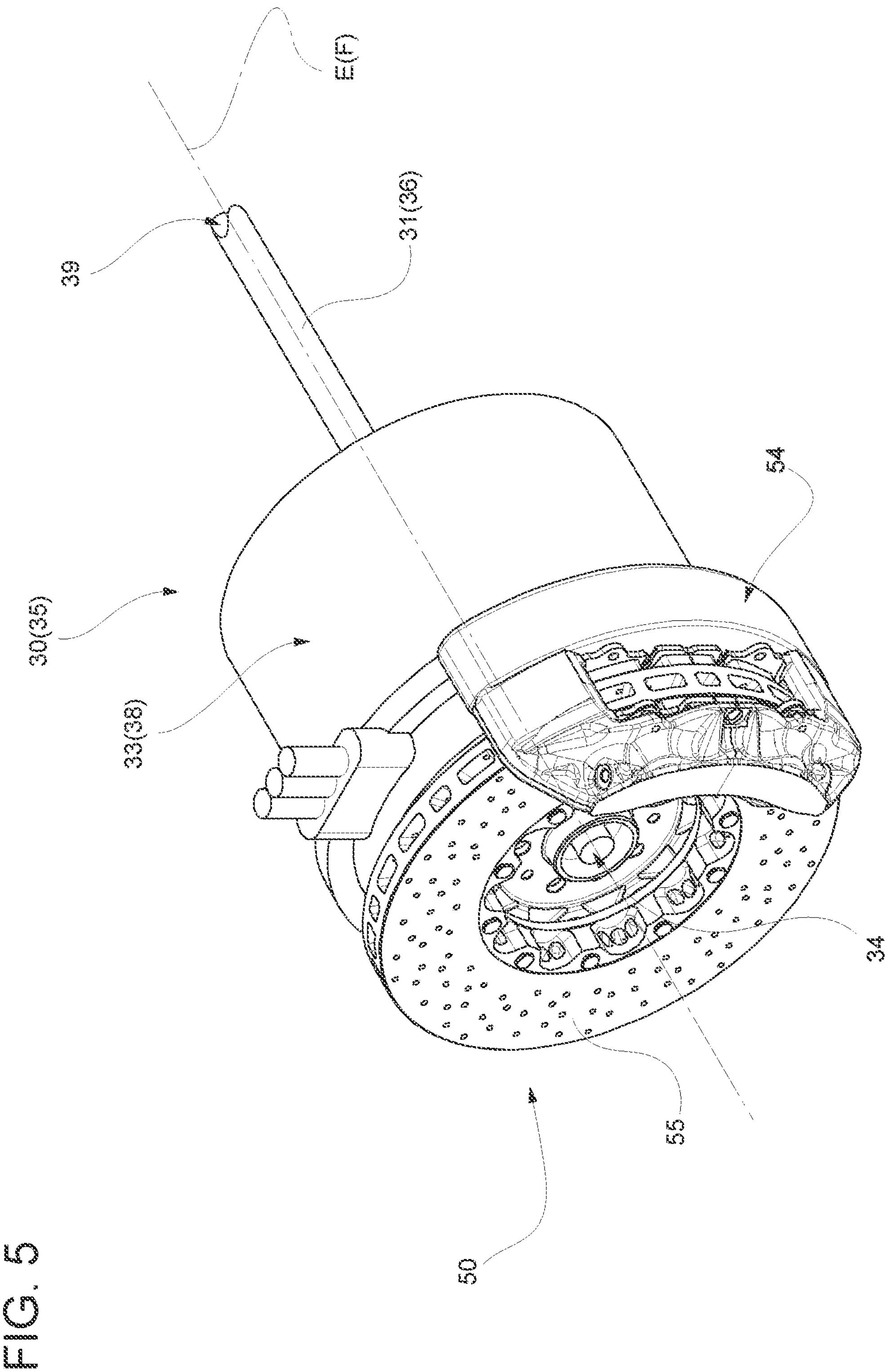

With reference to FIGS. 1 and 2, number 1 indicates a motor vehicle comprising a body 2 defining a passenger compartment 3.

The motor vehicle 1 is a top-of-the-range motor vehicle designed both for a conventional urban/suburban use and for a racing use.

The motor vehicle 1 is, furthermore, an electric vehicle.

Hereinafter, expressions such as "above", "under", "in front of", "behind" and others similar to them are used with reference to normal driving conditions of the motor vehicle 1.

Furthermore, it is possible to define:

a longitudinal axis X integral to the body 2, which, in use, is horizontal and parallel to a normal driving direction of the motor vehicle 1 indicated in the Figure;

a transverse axis Y integral to the body 2, which, in use, is horizontal and orthogonal to the axis X; and an axis Z integral to the body 2, which, in use, is vertical and orthogonal to the axes X, Y.

The body 2 defines a front 6 and a rear 7, with reference to a normal forward driving direction parallel to the axis X.

The motor vehicle 1 is, in the specific case shown herein, has a four-wheel drive.

The motor vehicle 1 further comprises:

a rear axle 10; and a front axle 15.

The axle 10 comprises, in turn:

a pair of front wheels 11, 12, which can rotate around respective axes A, B at respective rotation speeds ω1; and a pair of axle shafts 20, 21 connected to the respective front wheels 11, 12.

The axle 15 comprises, in turn:

a pair of rear wheels 16, 17, which can rotate around respective axes C, D; and a pair of axle shafts 22, 23 connected to the respective rear wheels 16, 17.

Hence, the motor vehicle 1 comprises:

an unsprung mass 45 comprising, in turn, the front wheels 11, 12 and the rear wheels 16, 17;

a sprung mass 46 comprising, in turn, the body 2;

a pair of front suspensions 24, 25 of the known kind and configured to elastically suspend the front wheels 11, 12 of the unsprung mass 45 to the body 2 of the sprung mass 46;

a pair of rear suspensions 26, 27 of the known kind and configured to elastically suspend the rear wheels 16, 17 of the unsprung mass 45 to the body 2 of the sprung mass 46.

Each front suspension 24, 25 (rear suspension 26, 27) comprises, extremely in short, an elastic element 28 and a damping element 29 interposed between the respective front wheels 11, 12 (rear wheels 16, 17) and the body 2.

Each front suspension 24, 25 and rear suspension 26, 27 allows the front wheels 11, 12 (rear wheels 16, 17) to move, in a known manner, relative to the body 2, following the irregularities of the ground according to an approximately vertical trajectory, hence parallel to the axis Z.

Consequently, the axes A, B (C, D) of the front wheels 11, 12 (rear wheels 16, 17) always remain approximately parallel to the axis Y of the body 2.

With reference to FIGS. 3 to 7, the axle 10 (15) further comprises:

a respective motor module 13 consisting of an electric motor 30 with an output shaft 31 and a transmission assembly 40 designed to operatively connect the output shaft 31 to the front wheel 11 (rear wheel 16); and a respective motor module 14 consisting of an electric motor 35 with an output shaft 36 and a transmission assembly 41 designed to operatively connect the output shaft 36 to the front wheel 12 (rear wheel 17).

In particular, each electric motor 30, 35 comprises a relative casing 33, 38 supporting the respective output shaft 31, 36 in a rotary manner around the respective axis E, F.

The output shafts 31, 36 can rotate around respective axes E, F at respective rotation speeds ω2, which are independent of one another and can be adjusted by the driver by means of an accelerator pedal.

The transmission assemblies 40, 41 are configured to create a fixed gear ratio between the rotation speeds ω2 of the output shafts 31, 36 and the corresponding rotation speeds ω1 of the front wheels 11, 12.

Each transmission assembly 40, 41 comprises, in particular (FIG. 7):

an intermediate shaft 44 receiving the motion from the respective output shaft 31, 36 through a gear 48 and capable of rotating at a respective rotation speed ω3; and an output shaft 47 receiving the motion from the respective intermediate shaft 44 through a gear 49 and comprising a respective output power take-off 42, 43 opposite the respective output shaft 30, 31 and connected to a respective axle shaft 20, 21 (22, 23) of a corresponding front wheel 11, 12 (rear wheel 16, 17).

The input shafts 31, 36 extend along respective axes E, F parallel to the axis Y and coinciding with one another.

Each intermediate shaft 44 can rotate around an axis G of its parallel to the axes E, F and A, B (C, D).

Each output shaft 47 can rotate around the axis A, B (C, D).

The transmission assemblies 40 41 are interposed between the casings 33, 38 of respective electric motors 30, 35, with reference to the corresponding axes E, F.

With reference to FIGS. 4 to 7, the motor vehicle 1 further comprises a plurality of disc brakes 50, 51, 52, 53 designed to exert respective braking torques upon the front wheels 11, 12 and the rear wheels 16, 17, respectively.

In short, each disc brake 50, 51, 52, 53 comprises:

a pad 54 fixed to the body 2 in a movable manner; and a disc 55.

Each pad 54 is selectively movable, due to the action of a command of a driver imparted by means of a brake pedal and/or of an automatic brake assist system, between:

- a rest position, in which it is spaced apart from the respective disc 55 and, hence, does not exert any braking torque upon the respective disc 55; and
- an operating position, in which is it pressed, in a sliding manner, against the respective disc 55 and, hence, exerts a braking torque upon the respective disc 55.

Advantageously, the disc brakes 50, 51, 52, 53 can selectively be operated so as to directly exert a braking torque upon the output shafts 31, 36 capable of rotating, in use, at the rotation speed ω2, which is different from the rotation speed ω1.

More in detail, each shaft 31, 36 has respective axial ends 34, 39 opposite one another and axially projecting from the respective casing 33, 38.

Figure 7:
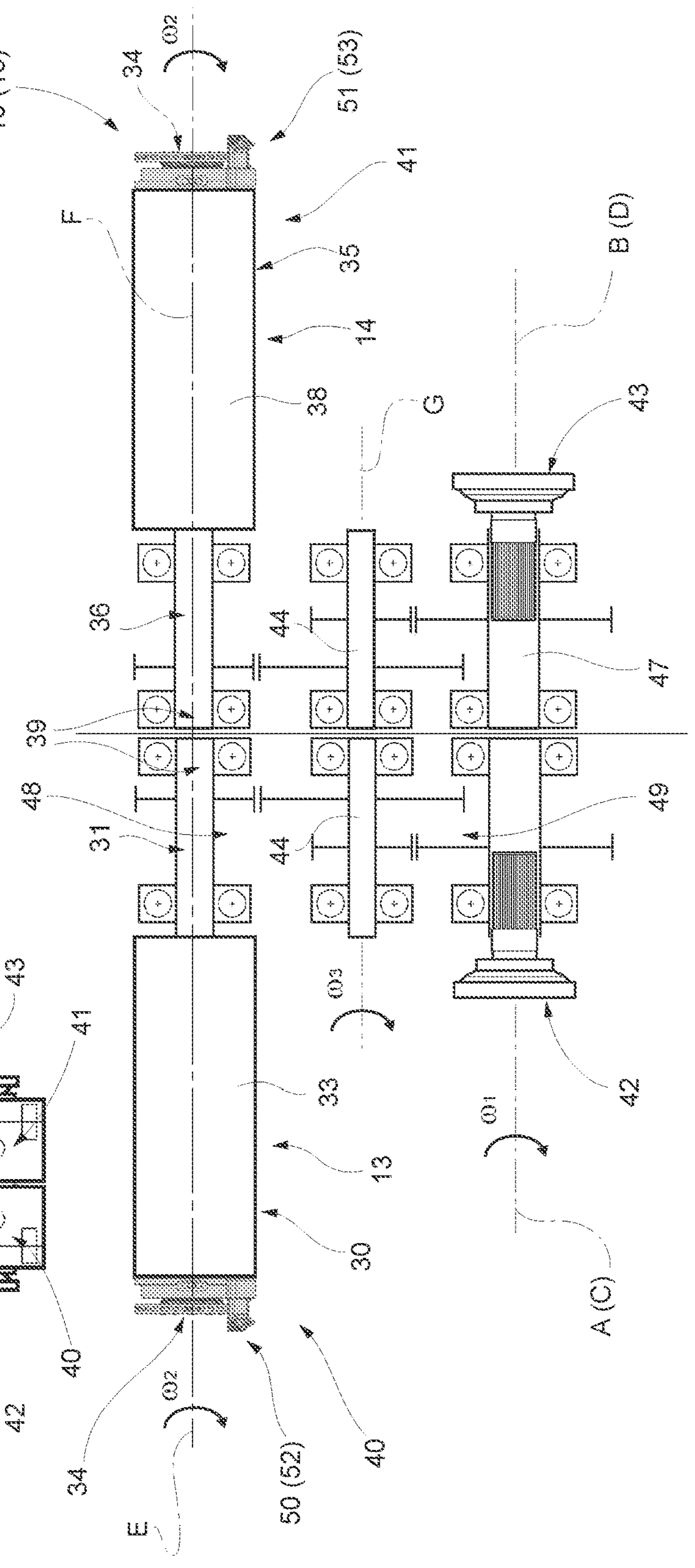
FIG. 7 shows the operating diagram of FIG. 6 on a larger scale and with parts removed for greater clarity.
Figure 6:
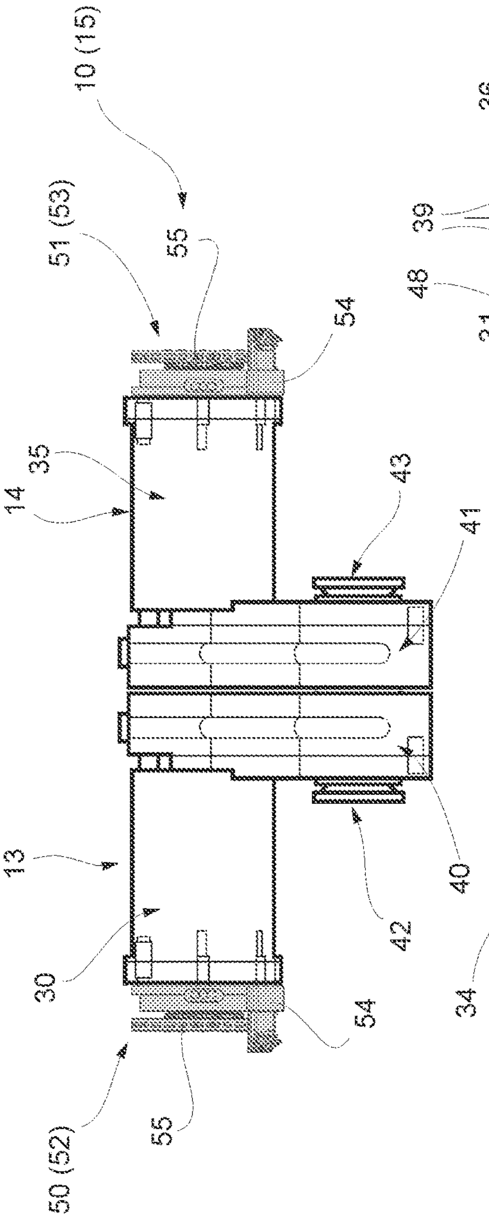
FIG. 6 shows an operating diagram of some components of the axle of FIG. 3.

With reference to FIGS. 6 and 7, the ends 39 of the output shafts 31, 36 face one another and are interposed between the ends 34 of the shafts 31, 36.

The discs 55 are mounted at the ends 34 of the shafts 31, 36.

The power take-offs 42, 43 are located in the area of respective ends of respective output shafts 47 axially arranged towards corresponding ends 34 of respective input shafts 31, 36.

Figures 8, 9, 10, 11:
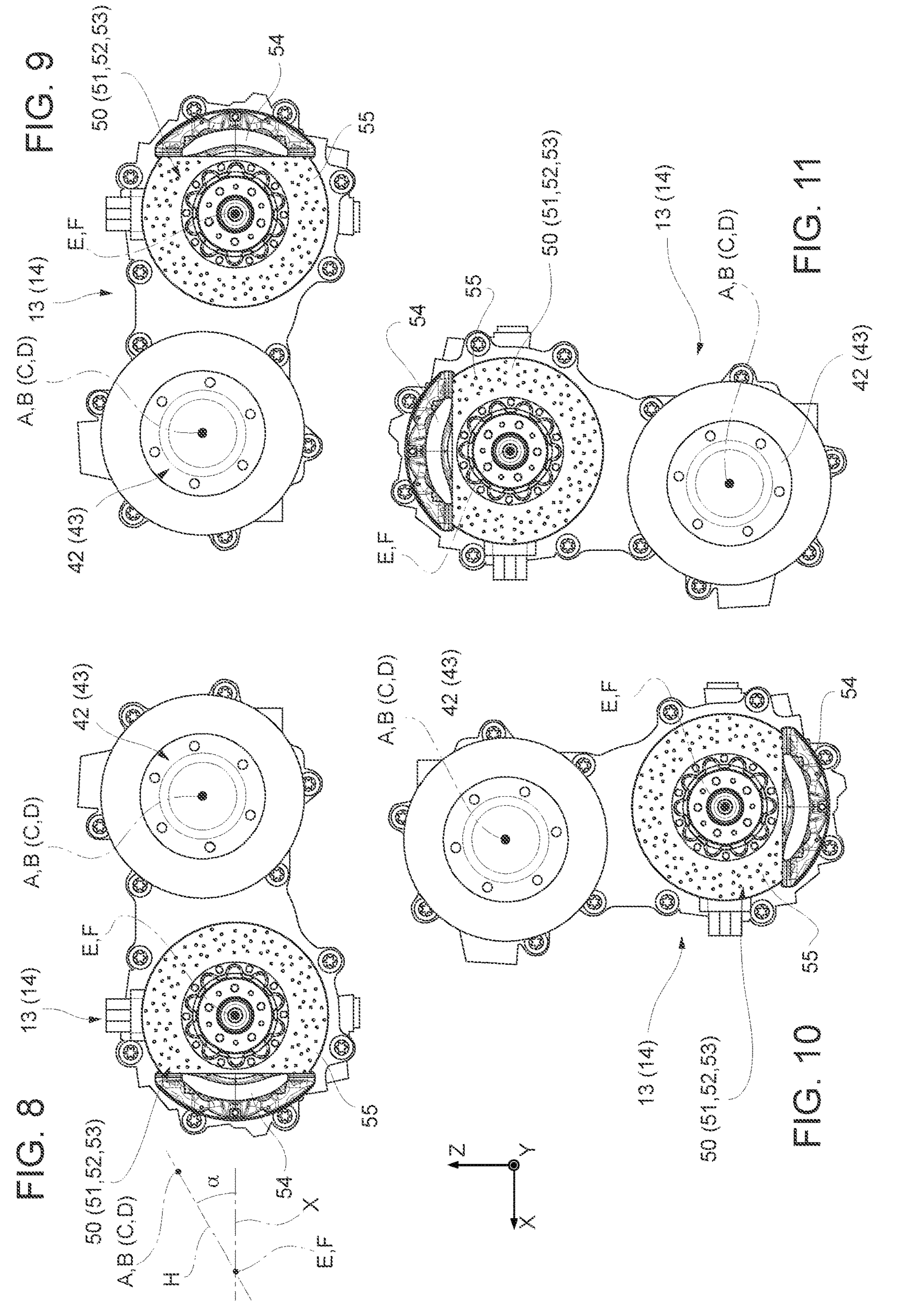
FIG. 8 is a side view of the axle of FIGS. 2 to 7, with parts removed for greater clarity.
FIGS. 9 to 14 show side views of variants of the axle of FIG. 8, with parts removed for greater clarity.

As shown in FIG. 8, the axes E, F are staggered relative to the axes A, B both along the axis X and along the axis Z.

More in detail, the axes E, F are located in front of and under the respective axes A, B (C, D).

In particular, the axes E, F are joined by an axis H defining, with the axis X, an acute angle α smaller than 45 degrees.

Figures 12, 13, 14:
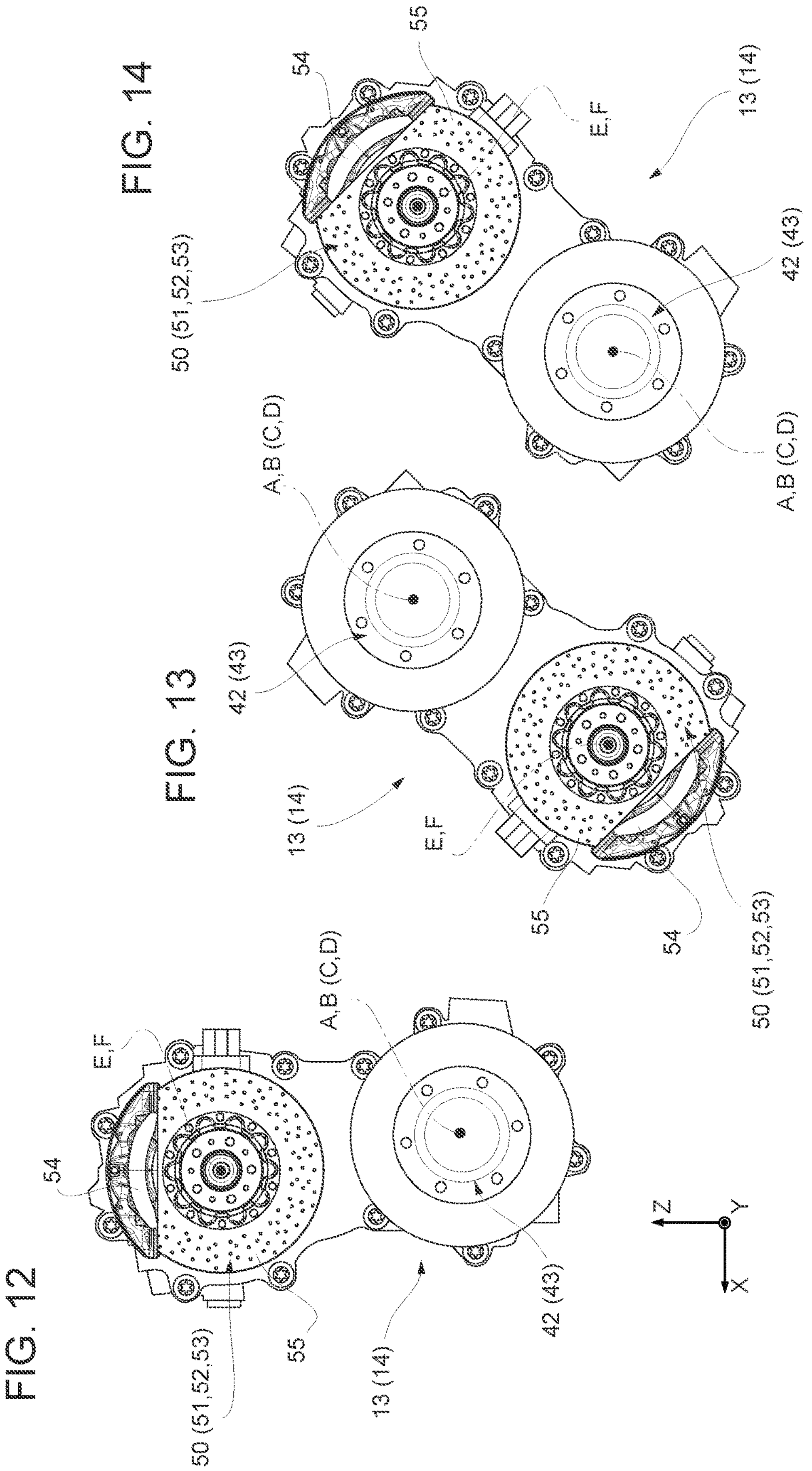

As shown in FIGS. 9 to 14, in alternative embodiments of the invention, the axes E, F are located:

- behind and under the respective axes A, B (C, D) (FIG. 9) with an acute angle α between the axes H, X smaller than 45 degrees;
- behind and under the respective axes A, B (C, D) (FIG. 10) with an acute angle α between the axes H, X larger than 45 degrees;
- behind and above the respective axes A, B (C, D) (FIG. 11) and between the axes H, so that the axis H defines, with the axis X, an acute angle α larger than 45 degrees;
- in front of and above the respective axes A, B (C, D) (FIG. 12);
- in front of and under the respective axes A, B (C, D) so that the axis H defines, with the axis X, an acute angle α larger than 45 degrees (FIG. 13); and
- behind and above the respective axes A, B (C, D) so that the axis H defines, with the axis X, an acute angle α smaller than 45 degrees (FIG. 14).

The electric motors 30, 35 and the disc brakes 50, 51, 52, 53 are part of the sprung mass 46.

In the specific case shown herein, the rotation speed ω2 is greater than the rotation speed ω3.

The rotation speed ω3 is, in turn, greater than the rotation speed ω1.

In use, the electric motors 30, 35 of the axles 10; 15 cause the rotation of the output shafts 31, 36 at respective rotation speeds ω2 around the corresponding axes E, F, based on the command imparted by the driver to the accelerator pedal.

The transmission assemblies 40, 41 transmit the drive torque from the output shafts 31, 36 to the axle shafts 20, 21; 22, 23 of the respective front wheels 11, 12 and rear wheels 16, 17 capable of rotating at respective rotation speeds ω1.

In case the brake pedal is operated or automatic stability control systems of the motor vehicle 1 intervene, the pads 54 of the disc brakes 50, 51, 52, 53 move from the respective rest position to the respective operating positions, thus exerting respective braking torques upon the output shafts 31, 36 of the modules 13, 14 rotating at respective rotation speeds ω1.

Said braking torques are transmitted to the front wheels 11, 12 and to the rear wheels 16, 17 by the transmission assemblies 40, 41.

Figure 15:
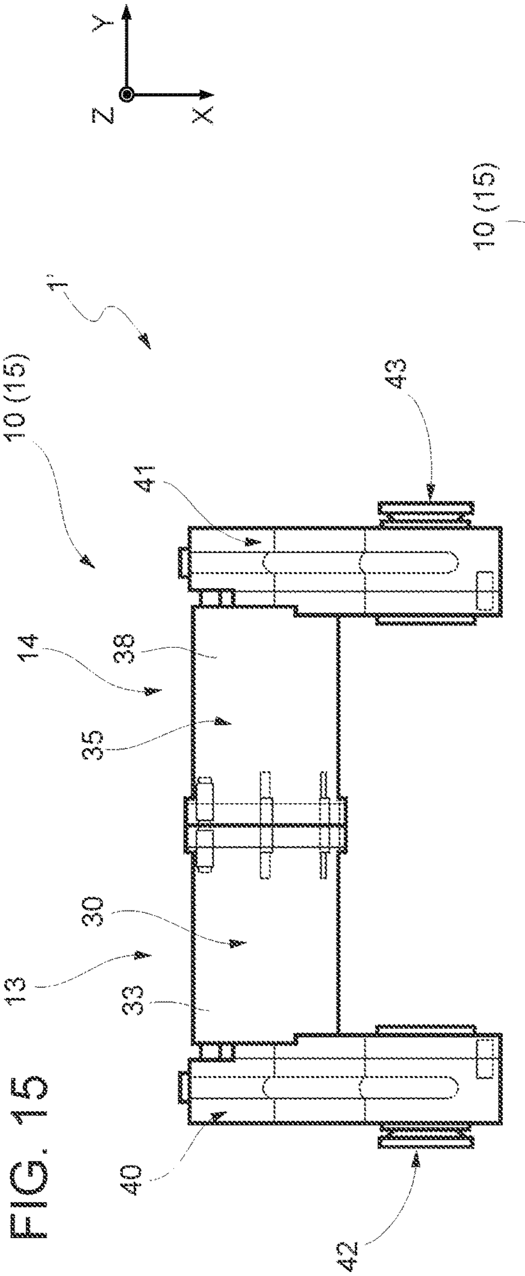
FIG. 15 shows an operating diagram of some components of an axle of a motor vehicle according to a second embodiment of the invention.
Figure 16:
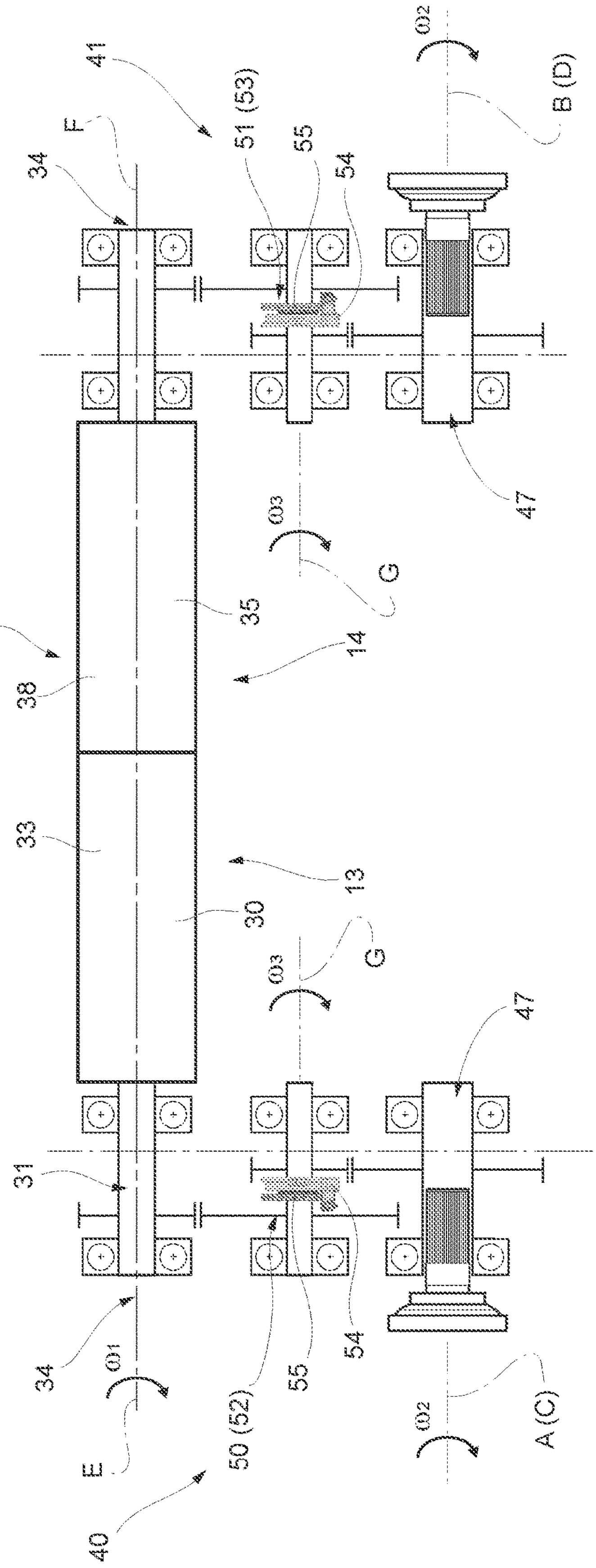
FIG. 16 shows the operating diagram of FIG. 15 on a larger scale and with parts removed for greater clarity.

With reference to FIGS. 15 and 16, number 1' indicates a motor vehicle according to a different embodiment of the invention.

The motor vehicle 1' is similar to the motor vehicle 1 and will be described below only in those aspects that distinguish the former from the latter; similar or equivalent parts of the motor vehicles 1, 1' will be indicated, when possible, with the same reference numbers.

In particular, the motor vehicle 1' differs from the motor vehicle 1 in that the casings 33, 38 of the respective electric motors 30, 35 are interposed between the respective transmission assemblies 40, 41, with reference to the corresponding axes E, F.

Furthermore, the motor vehicle 1' differs from the motor vehicle 1 in that the discs 55 of the brakes 50, 51, 52, 53 are splined to the intermediate shafts 44 of the respective transmission assemblies 40, 41.

The operation of the motor vehicle 1' differs from the operation of the motor vehicle 1 in that the discs 55 exert the respective braking torques upon the intermediate shafts 44 capable of rotating at respective rotation speeds ω3.

Figure 17:
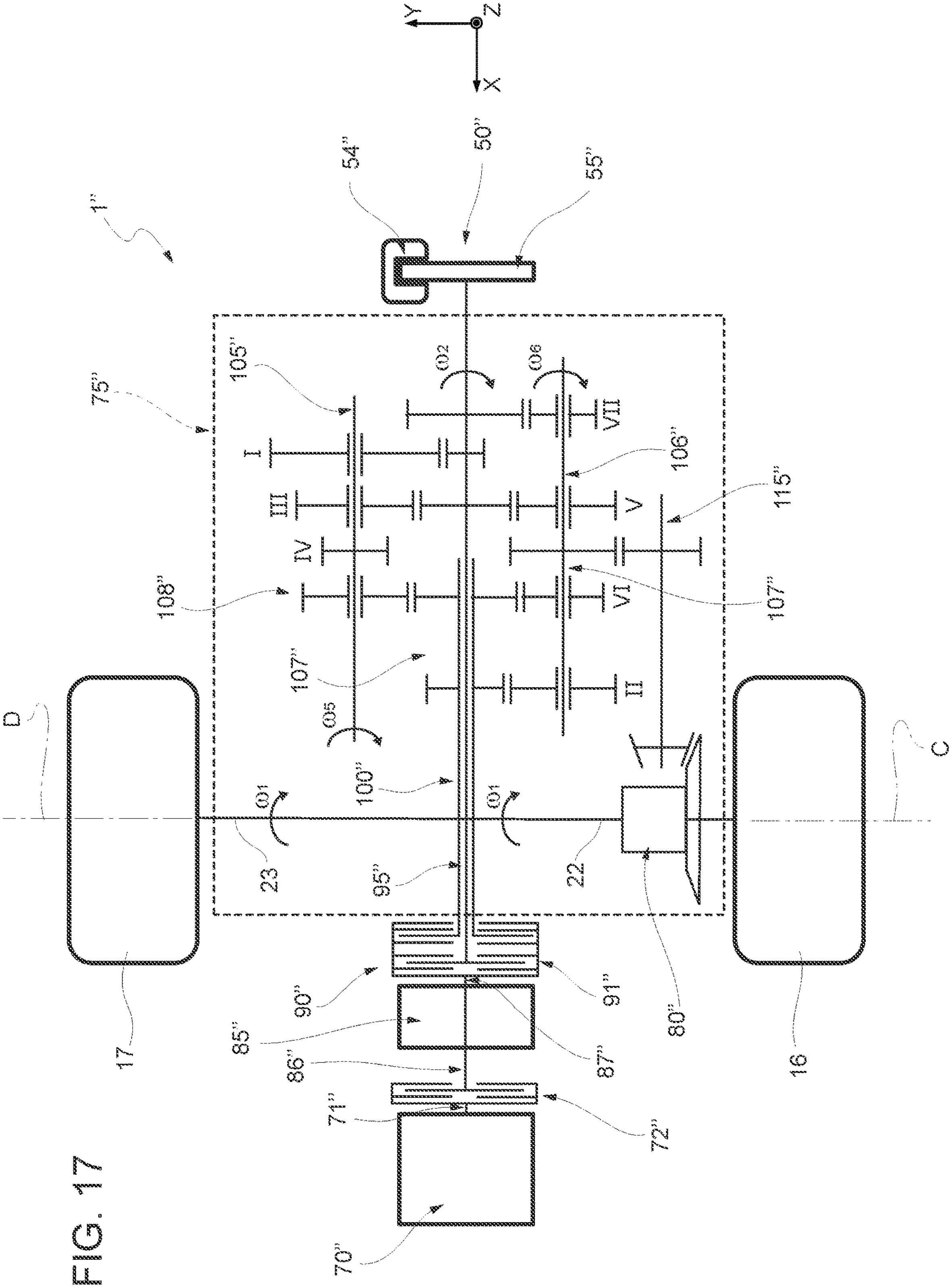
FIGS. 17 to 19 show operating diagrams of a motor vehicle according to a third, fourth and fifth embodiment, respectively, with parts removed for greater clarity.

With reference to FIG. 17, number 1" indicates a motor vehicle according to a different embodiment of the invention.

The motor vehicle 1" is similar to the motor vehicle 1 and will be described below only in those aspects that distinguish the former from the latter; similar or equivalent parts of the motor vehicles 1, 1" will be indicated, when possible, with the same reference numbers.

More in detail, the motor vehicle 1" differs from the motor vehicle 1 in that it is a rear-wheel drive hybrid vehicle.

Furthermore, the motor vehicle 1" differs from the motor vehicle 1 in that it comprises:

- an internal combustion engine 70" configured to cause the rotation of an output shaft 71" of its;
- an electric machine 85" comprising an input shaft 86" and an output shaft 87";
- a clutch 72", which can selectively be operated to couple or uncouple the output shaft 71" of the engine 70" and the input shaft 86" of the electric machine 85";
- a dual-clutch gearbox 75" provided with an output shaft 115"; and
- a differential 80", which receives the motion from the output shaft 115" and transfers it to the axle shafts 22, 23 of the rear wheels 16, 17.

In particular, the gearbox 75" comprises:

- two primary shafts 95" and 100" coaxial to one another and with axis Z, independent and inserted inside one another;
- two coaxial clutches 90" and 91" arranged in series, each designed to connect a respective primary shaft 95" or 100" to the output shaft 87" of the electric machine 85"; and
- two secondary shafts 105" and 106", which are both angularly integral to the input of the differential 80" through the output shaft 115".

The primary shafts 95" and 100" are mechanically coupled to the secondary shafts 105" and 106" by means of a plurality of gear pairs 107", each defining a respective gear and comprising a primary gear wheel mounted on a shaft 95" or 100" and a secondary gear wheel, which is mounted on a secondary shaft 105" or 106" and permanently meshes with the primary gear wheel. In order to allow for a correct operation of the dual-clutch gearbox 75", all odd gears (first gear I, third gear III, fifth gear V, seventh gear VII) are coupled to the same primary shaft 95", whereas all even gears (second gear II, fourth gear IV and sixth gear VI) are coupled to the other primary shaft 100".

Each primary gear wheel is splined to a respective primary shaft 95", 100", so as to always rotate with the primary shaft 95", 100" in an integral manner, and permanently meshes with the respective secondary gear wheel; on the other hand, each secondary gear wheel is mounted idle on its own secondary shaft 105", 106".

The dual-clutch gearbox 75" further comprises, for each gear pair 107", a corresponding synchronizer 108", which is coaxial to the relative secondary shaft 105", 106" and is designed to be actuated so as to engage the respective secondary gear wheel on the secondary shaft 105" or 106" (i.e. so as to cause the secondary gear wheel to become angularly integral to the secondary shaft 105" or 106").

In particular, the shafts 105", 106" rotate at respective rotation speeds ω5, ω6, which are different from and greater than the rotation speed ω1.

In a known manner, the differential 80" is configured to cause the rotation of the axle shafts 22, 23 and of the respective rear wheels 16, 17 around the corresponding axes C, D at corresponding rotation speeds ω1, which are identical to one another when the motor vehicle 1" travels along a straight trajectory, and at corresponding rotations speeds ω1, which are different from one another when the motor vehicle 1" travels along a curved trajectory.

Furthermore, the motor vehicle 1" differs from the motor vehicle 1 in that it comprises one single disc brake 50" with one single disc 55" splined on the primary shaft 95" capable of rotating at a rotation speed ω2, which is different from and, in particular, greater than the rotation speed ω1.

The disc brake 50" can selectively be operated so as to directly exert a braking torque upon the primary shaft 95" capable of rotating, in use, at the rotation speed ω2, which is different from and, in particular, greater than the rotation speed ω1.

The operation of the motor vehicle 1" differs from the operation of the motor vehicle 1 in that it can offer:

- a heat operating mode, in which the clutch 72" couples the shafts 71" and 86", the drive torque is generated by the sole engine 70" and the electric machine 85" is deactivated;
- an electric operating mode, in which the engine 70" is deactivated and/or the clutch 72" uncouples the shafts 71" and 86" and the drive torque is generated by the sole electric machine 85" operated as electric motor; or
- a combined operating mode, in which the clutch 72" couples the shafts 71" and 86", the drive torque is generated both by the engine 70" and by the electric machine 85" operated as electric motor.

Regardless of the selected operating mode, the output shaft 87" is subjected to a drive torque and is connected by the clutch 90" to the primary shaft 95" or by the clutch 91" to the primary shaft 100".

In particular, the primary shaft 95" rotates around an axis Z of its at a rotation speed ω2, which is different from and, in particular, greater than the rotation speed ω1.

The gearbox 75" transmits the motion, with the requested gear, from the primary shaft 95" or from the primary shaft 100" to the output shaft 115" connected to the differential 80". The differential 80" causes the rotation of the axle shafts 22, 23 and of the respective rear wheels 16, 17 at corresponding rotation speeds ω1, which are identical to one another when the motor vehicle 1" travels along a straight trajectory, and at corresponding rotations speeds ω1, which are different from one another when the motor vehicle 1" travels along a curved trajectory.

In case the brake pedal is activated, the pad 54" moves from the rest position to the operating position, thus exerting a braking torque upon the disc 55" integral to the primary shaft 95" capable of rotating at respective rotation speeds ω2.

Said braking torque is transmitted to the rear wheels 16, 17 by the secondary shaft 105", by the output shaft 110" and by the differential 80".

In case the brake pedal is activated, the clutch 72" uncouples the shafts 71" and 86" and the electric machine 85" is operated as electric generator. In this way, part of the kinetic energy of the secondary shaft 105" and, hence, of the rear wheels 16, 17 is converted into energy and becomes available for a battery that is not shown herein.

Figure 18:
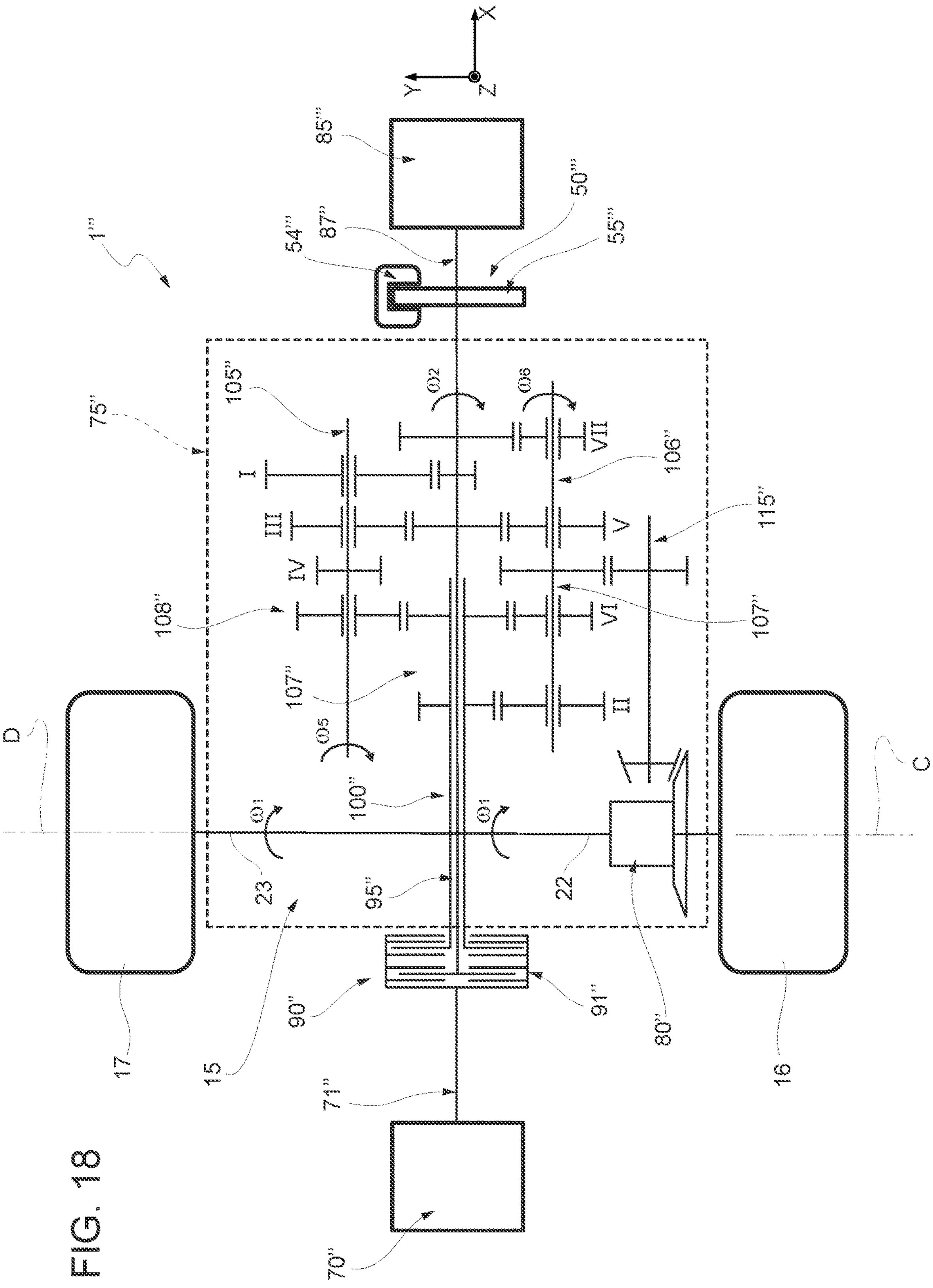

With reference to FIG. 18, number 1'" indicates a motor vehicle according to a different embodiment of the invention.

The motor vehicle 1'" is similar to the motor vehicle 1" and will be described below only in those aspects that distinguish the former from the latter; similar or equivalent parts of the motor vehicles 1", 1"" will be indicated, when possible, with the same reference numbers.

The motor vehicle 1'" differs from the motor vehicle 1" in that it does not comprise the clutch 72'" and in that the output shaft 87" of the electric machine 85" coincides with or is angularly integral to the primary shaft 95" of the gearbox 75". In this way, the internal combustion engine 70"" and the electric machine 85" operated as motor are in parallel to one another.

The operation of the motor vehicle 1'" differs from the operation of the motor vehicle 1" in that the activation of the electric machine 85" as electric motor determines a further drive torque exerted upon the primary shaft 95" of the gearbox 75" and in that the activation of the disc brake 50'" allows the kinetic energy of the primary shaft 95'" to be converted into electrical energy through the use of the electric machine 85'" as electric generator.

Figure 19:
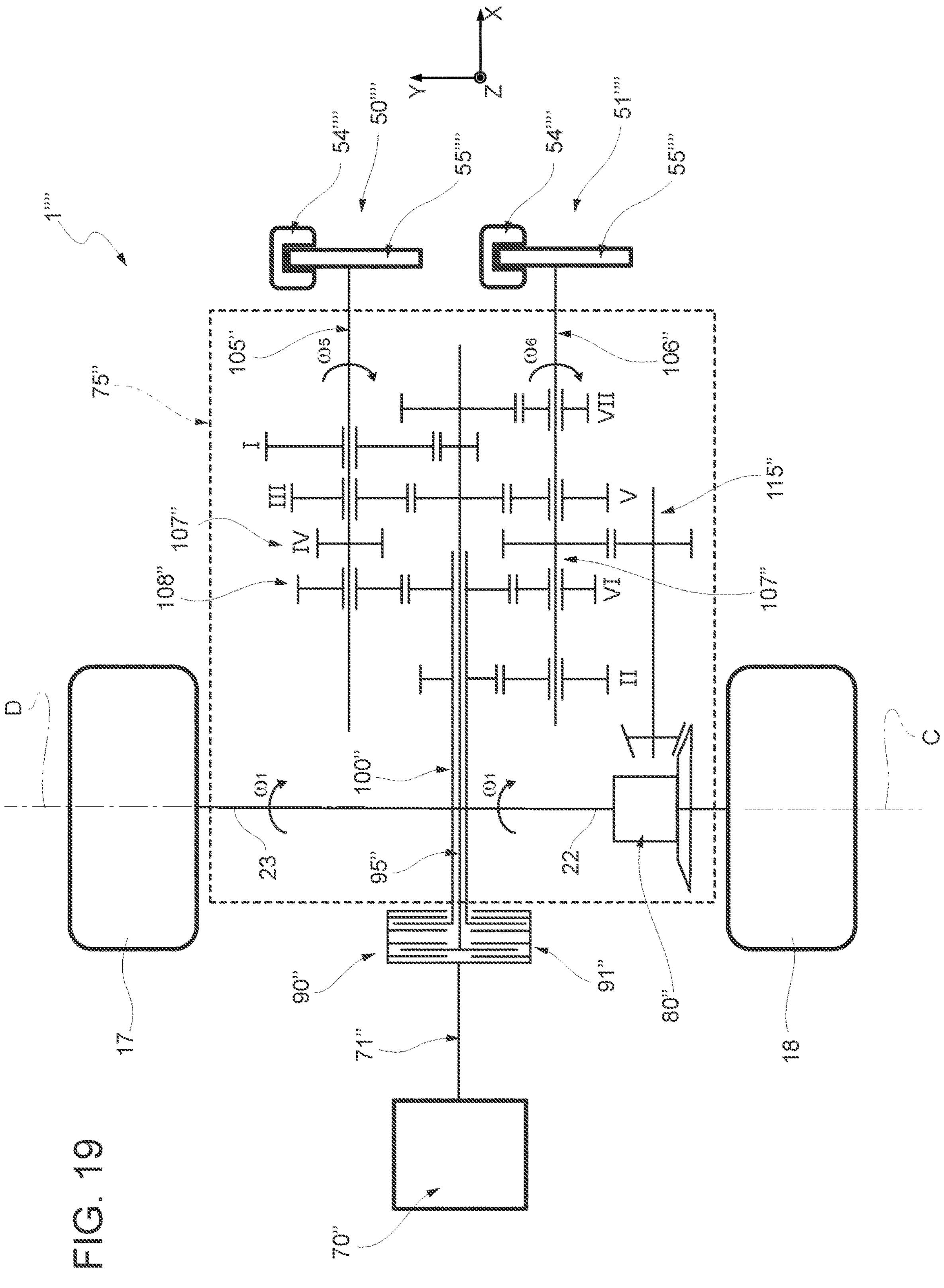

With reference to FIG. 19, number 1"" indicates a motor vehicle according to a different embodiment of the invention.

The motor vehicle 1"" is similar to the motor vehicle 1" and will be described below only in those aspects that distinguish the former from the latter; similar or equivalent parts of the motor vehicles 1", 1"" will be indicated, when possible, with the same reference numbers.

More in detail, the motor vehicle 1"" differs from the motor vehicle 1" in that it is heat-operated vehicle.

More in particular, the motor vehicle 1"" differs from the motor vehicle 1" in that it does not comprise the electric machine 85" and the clutch 95"".

Furthermore, the motor vehicle 1"" differs from the motor vehicle 1" in that it comprises:

- a disc brake 50"" comprising a disc 54"" splined to the secondary shaft 105" capable of rotating at a rotation speed ω5, which is different from and, in the specific case shown herein, greater than the rotation speed ω1 of the rear wheels 16, 17; and a disc brake 51"" comprising a disc 54"" splined to the secondary shaft 106" capable of rotating at a rotation speed ω6, which is different from and, in the specific case shown herein, greater than the rotation speed ω1 of the rear wheels 16, 17.

The operation of the motor vehicle 1"" differs from the operation of the motor vehicle 1" in that it can offer the sole heat operating mode.

Furthermore, the operation of the motor vehicle 1"" differs from the operation of the motor vehicle 1" in that, in case the brake pedal is activated, the disc brake 50"" exerts a first braking torque upon the secondary shaft 105" capable of rotating at a rotation speed ω5, which is different from and greater than the rotation speed ω1, and the disc brake 51"" exerts a second braking torque upon the secondary shaft 106" capable of rotating at a rotation speed ω6, which is different from and greater than the rotation speed ω1.

Said first and second braking torques are transmitted to the rear wheels 16, 17 by the output shaft 115" and by the differential 80".

With reference to FIG. 20, number 1""""" indicates a motor vehicle according to a different embodiment of the invention.

The motor vehicle 1""" is similar to the motor vehicle 1" and will be described below only in those aspects that distinguish the former from the latter; similar or equivalent parts of the motor vehicles 1, 1""" will be indicated, when possible, with the same reference numbers.

In particular, the motor vehicle 1""" differs from the motor vehicle 1 in that the power take-off 42" (43""") of the module 13""" (14"""") of the respective output shaft 47 is axially located on the side of the end 39 of the output shaft 31.

The operation of the motor vehicle 1"""" is similar to the one of the motor vehicle 1 and, therefore, it will not be described in detail.

The disclosure above reveals evident advantages that can be reached with the invention.

In particular, the disc brakes 50, 51, 52, 53; 50"; 50'"; 50"", 51"" exert the braking torque upon a mechanical member—the output shaft 31, 36; the intermediate shaft 44, the primary shaft 95"; the secondary shafts 105", 106"-which rotates at a rotation speed ω2; ω3; 02; ω5, ω6 that is different from and, in particular, greater than the rotation speed ω1 of the front wheels 10, 11.

Therefore, the braking torque requested to the disc brake 50, 51, 52, 53; 50"; 50"""; 50"", 51"" can be reduced, given the same dissipated braking power. This is due to the fact that the output shaft 31, 36; the intermediate shaft 44, the primary shaft 95"; the secondary shafts 105", 106" have rotation speeds ω2; ω3; ω2; ω5, ω6 that are greater than the rotation speed ω1 of the front wheels 10, 11 and of the rear wheels 16, 17. This reduction in the braking torque leads to a reduction in the dimensions and, consequently, in the weight and the space taken up by the disc brakes 50, 51, 52, 53; 50"; 50'"; 50"", 51"".

This dimension and weight reduction is particularly relevant for the motor vehicles 1, 1""", since the output shafts 31, 36 of the electric motors 30, 35 have particularly high rotation speeds ω2.

This dimension and weight reduction is particularly advantageous in the motor vehicles 1, 1', 1", 1"", 1"" comprising the electric machines 30, 35; 85"; wherein the braking torque requested to the disc brakes 50, 51, 52, 53; 50"; 50"""; 50"", 51"" already is small. Indeed, in the aforesaid motor vehicles 1, 1', 1", 1'", 1"", part of braking torque can be obtained by operating the aforesaid electric machines 30, 35; 85" as electric generators. Consequently, the overall dimensions and weights of the disc brakes 50, 51, 53, 53; 50"; 50'"; 50"", 51"" are further reduced.

Thanks to the fact that the disc brakes 50, 51, 52, 53; 50"; 50'"; 50"", 51""" are no longer directly mounted on the front wheels 11, 12 (and rear wheels 16, 17), designers have utmost manufacturing flexibility when dealing with the layout of the front wheels 11, 12 (and rear wheels 16, 17).

Finally, thanks to the fact that the disc brakes 50, 51, 52, 53; 50"; 50'"; 50"", 51"" are part of the sprung mass 46, the dynamics of the motor vehicle 1, 1', 1", 1", 1"", 1"" can significantly be improved.

Finally, the motor vehicle 1, 1', 1", 1'", 1"" according to the invention can be subjected to changes and variations, which, though, do not go beyond the scope of protection set forth in the appended claims.

In particular, the motor vehicle 1, 1' could be a front-wheel drive vehicle and comprise the sole modules 13, 14 arranged on the axle 10. Alternatively, the motor vehicle 1, 1' could be a rear-wheel drive vehicle and comprise the sole modules 13, 14 arranged on the axle 15.

Similarly, the motor vehicle 1", 1", 1"" could be a front-wheel drive vehicle. In this case, the differential 80" would be connected to the axle shafts 20, 21 of the front wheels 11, 12. Alternatively, the motor vehicle 1", 1", 1"" could be an all-wheel drive vehicle. In this case, the output shaft 115" of the gearbox 75" would also be connected to the axle shafts 20, 21 of the respective front wheels 11, 12.

The motor vehicle 1""" could comprise further modules 13"", 14""" connected to the remaining front wheels 12 and/or to the rear wheels 16, 17.

Finally, the motor vehicle 1, 1', 1", 1", 1"", 1""" could comprise brakes with a different layout than the disc brakes 50, 51, 52, 53; 50"; 50"""; 50"", 51"", for example drum brakes.

The invention claimed is:

1. A motor vehicle comprising:

at least one first driving member;

a plurality of wheels with at least one wheel of said plurality of wheels, which is angularly integral to a first shaft, being operatively connected to said first driving member and can rotate, in use, with a first rotation speed; and at least one brake;

said brake can selectively be operated so as to directly exert a braking torque upon a second shaft of said motor vehicle other than said first shaft and capable of rotating, in use, with a second rotation speed, which is different from said first rotation speed;

said second shaft being operatively connected to said first shaft;

said first driving member being an electric driving member;

said motor vehicle further comprising:

a second heat driving member provided with a second output member; and gearbox interposed between said second heat driving member and at least two wheels of said plurality of wheels;

said gearbox comprising said second shaft and being capable of being selectively operated so as to change, in a discrete manner and according to a plurality of gears, the ratio between said first rotation speed and a third rotation speed, with which, in use, said second output member of said second heat driving member rotates;

wherein said motor vehicle further comprises:

a first clutch configured to connect, in a selectively releasable manner, said second output member and a third input shaft of said first driving member; and a second clutch configured to connect, in a selectively releasable manner, said third input shaft to said gearbox.

2. The motor vehicle according to claim 1, wherein said second shaft is a first output member of said first driving member.

3. The motor vehicle according to claim 2, wherein said first driving member comprises a casing supporting said second shaft in a rotary manner;

said second shaft comprising, in turn:

a first segment operatively connected to said first shaft; and a second segment, upon which said brake exerts, in use, said braking torque;

said first and second segment axially projecting from respective sides of said casing, which are axially opposite one another.

4. The motor vehicle according to claim 1, further comprising a transmission assembly, which is configured to transmit the motion from said first driving member to said at least one wheel and comprises said second shaft;

said transmission assembly being configured to provide at least a gear ratio that is different from one of said first rotation speed and said second rotation speed.

5. The motor vehicle according to claim 1, further comprising:

a pair of said first driving members operatively connected to respective wheels of said plurality of wheels capable of rotating around respective first shafts; and a pair of said second shafts, each associated with a respective driving member and with a respective wheel of said plurality of wheels.

6. The motor vehicle according to claim 1, characterized in that wherein said first shaft and said second shaft can rotate around a first axis and a second axis, respectively, which are staggered relative to one another.

7. The motor vehicle according to claim 6, further comprising:

a third axis, which is longitudinal and parallel, in use, to a normal forward driving direction of the motor vehicle;

a fourth axis, which is orthogonal to said third axis and is arranged, in use, in a vertical manner;

said first axis and said second axis being spaced apart from one another both parallel to said third axis and parallel to said fourth axis.

8. The motor vehicle according to claim 1, wherein said second shaft is an output member of said electric motor.

9. The motor vehicle according to claim 1, wherein said second driving member is an internal combustion engine.

10. The motor vehicle according to claim 1, wherein said second rotation speed is greater than said first rotation speed.

11. The motor vehicle according to claim 1, further comprising:

a body;

an unsprung mass comprising said at least one wheel;

a sprung mass comprising said body, said first driving member; and said brake; and at least one suspension designed to connect said unsprung mass and said sprung mass to one another in an elastic manner.

* * * * *